Aug. 24, 1965    KARL-AUGUST WÄCHTER    3,201,927
CLOSURE FOR FILTER CONTAINER
Filed Aug. 16, 1961    3 Sheets-Sheet 3

INVENTOR
Karl-August Wächter
BY Bailey, Stephens & Huettig
ATTORNEYS

United States Patent Office 3,201,927
Patented Aug. 24, 1965

3,201,927
CLOSURE FOR FILTER CONTAINER
Karl-August Wächter, Lubeck, Germany, assignor to Otto Heinrich Drager, Lubeck, Germany
Filed Aug. 16, 1961, Ser. No. 131,762
Claims priority, application Germany, Jan. 11, 1961, D 35,156
1 Claim. (Cl. 55—504)

This invention relates to closures and, in particular, is directed to closure means for a filter container.

Filters are well known for cleaning harmful particles from gases such as air which are drawn through the filter. They exist in various forms for cleaning air which is to be inhaled. The filtering material itself is enclosed in a container composed of sheet metal or the like. The filter material itself is attached to a support which is threaded into the container. The mass of fibers composing the filter material is shaped so as to present a large cross-sectional area offering low resistance to the air being drawn through the material. In so doing, the material is corrugated and shaped into a cylinder so that the air can flow outwardly through the material from the inside of the cylinder or vice versa. The large surface area desired for the filter material has the disadvantage in that the filter material occupies a large space and a corresponding large container and has the further disadvantage that it will become unfastened from the container when subjected to a strong vibration. A screw or threaded joint is usually used as the fastening means.

The object of this invention is to produce a structure which avoids the disadvantages of the heretofore used fastening means for the filter material. The objects of this invention are accomplished by, in addition to using a threaded joint for holding the filter material within the container, a tensioning and tightening device used to hold the filter material in position within the container. By so doing, the filter material is prevented from becoming involuntarily loosened from its fastening due to strong vibrations.

The means by which the objects of the invention are obtained are described more fully with reference to the accompanying schematic drawings in which.

Figure 1:
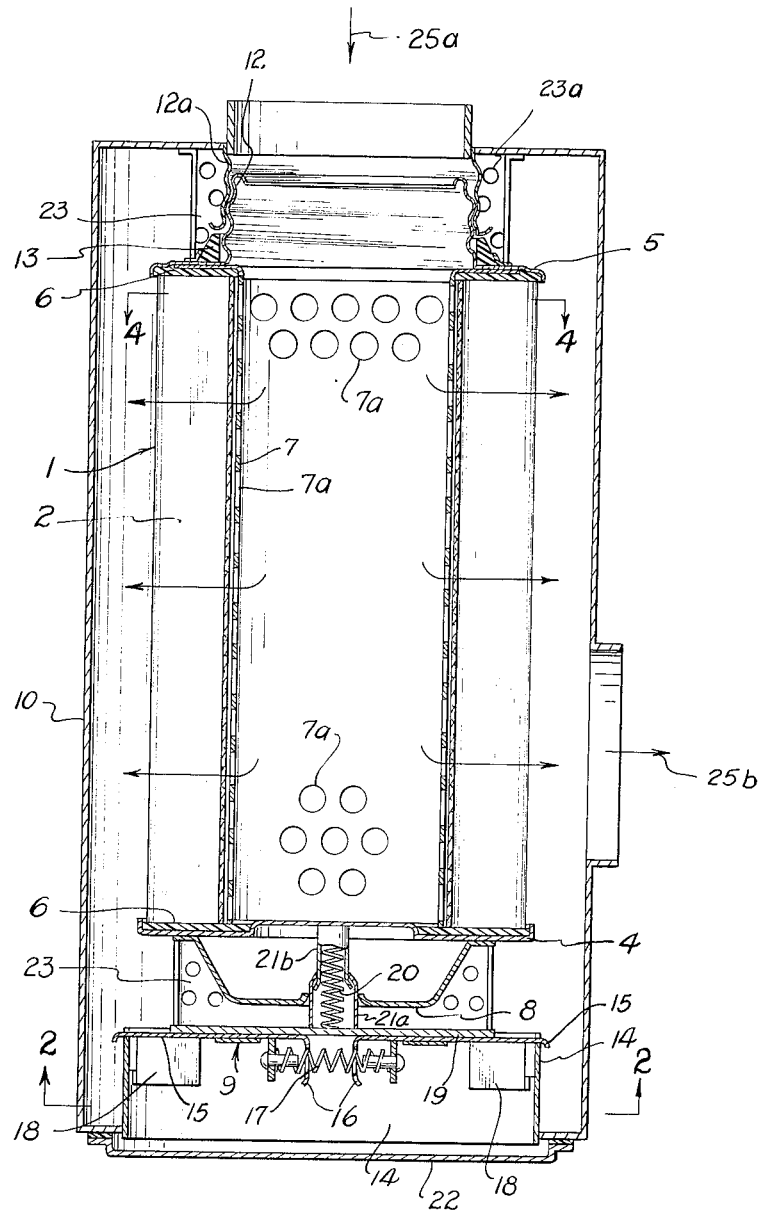
FIGURE 1 is a cross-sectional view through the filter container of this invention.
Figure 2:
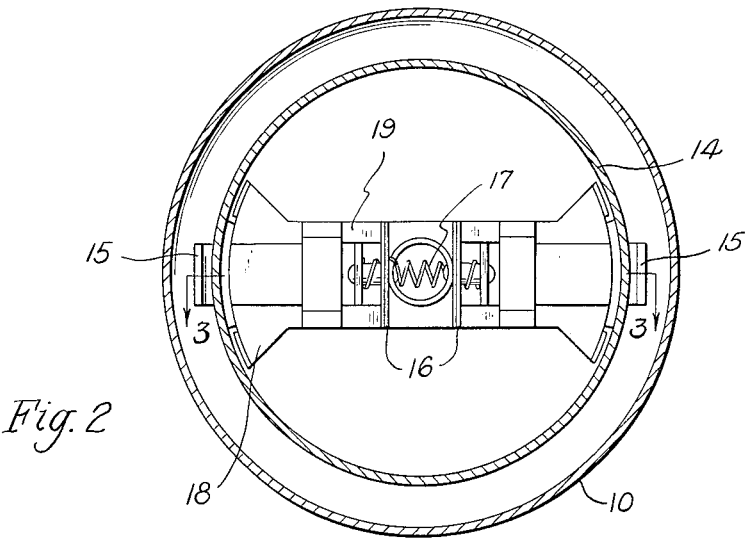
FIGURE 2 is a cross-sectional view taken on the line 2—2 of FIGURE 1.
Figure 3:
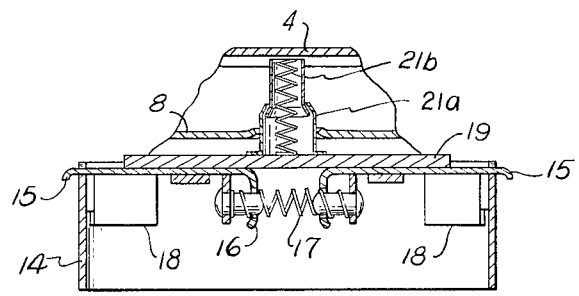
FIGURE 3 is a cross-sectional view taken on the line 3—3 of FIGURE 2.

The gas cleaning filter 1 is composed of filter material 2 which is formed from a flat sheet that is corrugated and shaped into a cylinder. This filter material is capped at each end by covers 4 and 5, respectively, the material 2 being secured to these covers by adhesive 6. Covers 4 and 5 are rigid and are joined to cylinder 7 provided with perforations 7a. Cover 4 can be fastened to cylinder 7 by a bayonet joint so that the cover can be put on after the material 2 has been inserted over the cylinder 7. When the adhesive 6 has set, the material 2, cylinder 7, and covers 4 and 5 are tightly joined as a unit.

A handle bracket 8 is secured to cover 4 and extends toward a fastening device 9 by means of which the bracket is centered and held within the outer container 10 as hereinafter described. The opposite cover 5 is secured to container 10 by means of a conventional threaded joint composed of a member 12 fixed to cover 5 and a member 12a fixed to container 10. A sealing ring 13 between members 12 and 12a produces an air-tight joint.

Fastening device 9 is positioned within a guide flange 14 secured to container 10 and serves to prevent the loosening of the threaded joint 12, 12a when the container is jolted and further serves to absorb vibrations of the relatively long filter material 2. This fastening device 9 has a pair of locking tongues 15, the bent ends of which extend through open notches in the edge of flange 14. The inner ends of tongues 15 are bent to form handles 16 between which is a spring 17 urging tongues 15 outwardly into locked position. Secured to fastening device 9 are flanges 18 closely conforming to the flange 14 and which serve to center fastening device 9 when it is inserted within flange 14. These flanges 18 are welded to the guideway 19 for the tongues 15 and are not moved when the tongues 15 are brought to locked or unlocked position.

A compression spring 20 is housed within a cylinder 21a attached to guideway 19 and a cylinder 21b which is telescoped within cylinder 21a. Cylinder 21a extends through an opening in the center of bracket 8. Thus spring 20 serves to press cylinder 21b against cover 4 of filter 1 and press the threaded members tightly together. It also absorbs vibrations occurring in the filter. The device 9 is removable as a unit composed of the parts 15 to 21b, inclusive.

Figure 4:
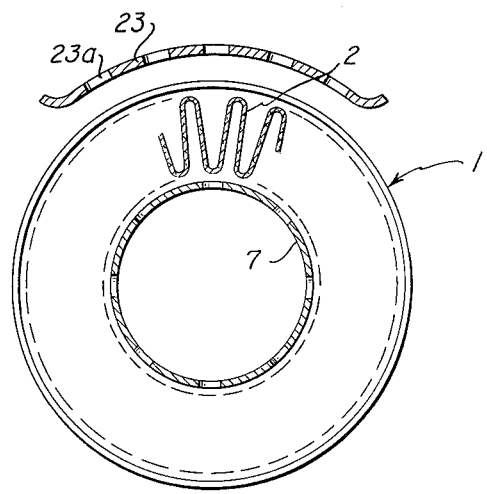
FIGURE 4 is a cross-sectional view taken on the line 4—4 of FIGURE 1.

The filter container 10 is opened by removing outer cover 22, which is secured to container 10 by any suitable means, and then removing fastening device 9 by first pushing the device inwardly to clear the bent free ends of tongues 15 from the slots in the flange 14 and then pinching together handle 16 to draw the tongues inwardly of flange 14 so that the fastening device 9 can be pulled outwardly. A filter 1 is then inserted into container 10 and member 12 threaded to member 12a. As shown in FIGURES 1 and 4, in order to guide the movement of cover 5 so that threaded members 12 and 12a can be engaged by centering filter 1 in cylinder housing 10, a single curved guide sheet 23 of greater radius of curvature than filter 1 is secured to the inner wall of housing 10. This guide sheet 23 has perforations 23a to reduce its weight. One end of sheet 23 is located adjacent the guide flange 14 while the other end of sheet 23 is positioned adjacent the member 12a. The fastening device 9 is then inserted and locked within flange 14 so that spring 20 presses cylinder 21b against cover 4 which, in turn, pushes the threaded members 12 and 12a into tight engagement. This invention has the advantage of having a simple and space-saving construction by means of which the filter 1 is held firmly against jolting or vibrations. The filter 1 can be easily replaced by a new filter.

The air intake for the filter is shown by the direction of the arrow 25a, with the air flowing through the perforations 7a of cylinder 7 outwardly into container 10 and then leaves container 10 through the opening as indicated by the arrow 25b.

Having now described the means by which the objects of the invention are obtained, I claim:

Closure means for an air dust filter comprising a container, a dust filter in said container, thread means for securing one end of said filter in said container, a handle bracket joined to the other end of said filter, spring-actuated tongue fastening means bearing on said handle bracket and removably attached to said container for holding said filter in said container, spring means extending between said fastening means and said filter for applying pressure against said thread means, and guide means for centering said filter in said container.

References Cited by the Examiner

UNITED STATES PATENTS

| | | | |
|---|---|---|---|
| 597,574 | 1/98 | Dick | 292—42 |
| 873,425 | 12/07 | Greis | 292—42 |
| 907,493 | 12/08 | Gunther | 292—42 |
| 1,521,872 | 1/25 | Dellinger | 55—513 XR |
| 2,220,706 | 11/40 | Cantin | 55—521 |
| 2,314,573 | 3/43 | Clark et al. | 55—498 |
| 2,478,109 | 8/49 | Kamrath | 210—487 |
| 2,709,524 | 5/55 | Russell et al. | 210—238 |
| 2,843,268 | 7/58 | Kennedy. | |
| 2,866,574 | 12/58 | Roumeliotis | 220—55 |
| 2,868,383 | 1/59 | Nicolls. | |
| 2,936,189 | 5/60 | Pearson | 220—55 |
| 2,958,394 | 11/60 | Woodmansee | 55—480 XR |

HARRY B. THORNTON, *Primary Examiner.*

HERBERT L. MARTIN, *Examiner.*